UNITED STATES PATENT OFFICE.

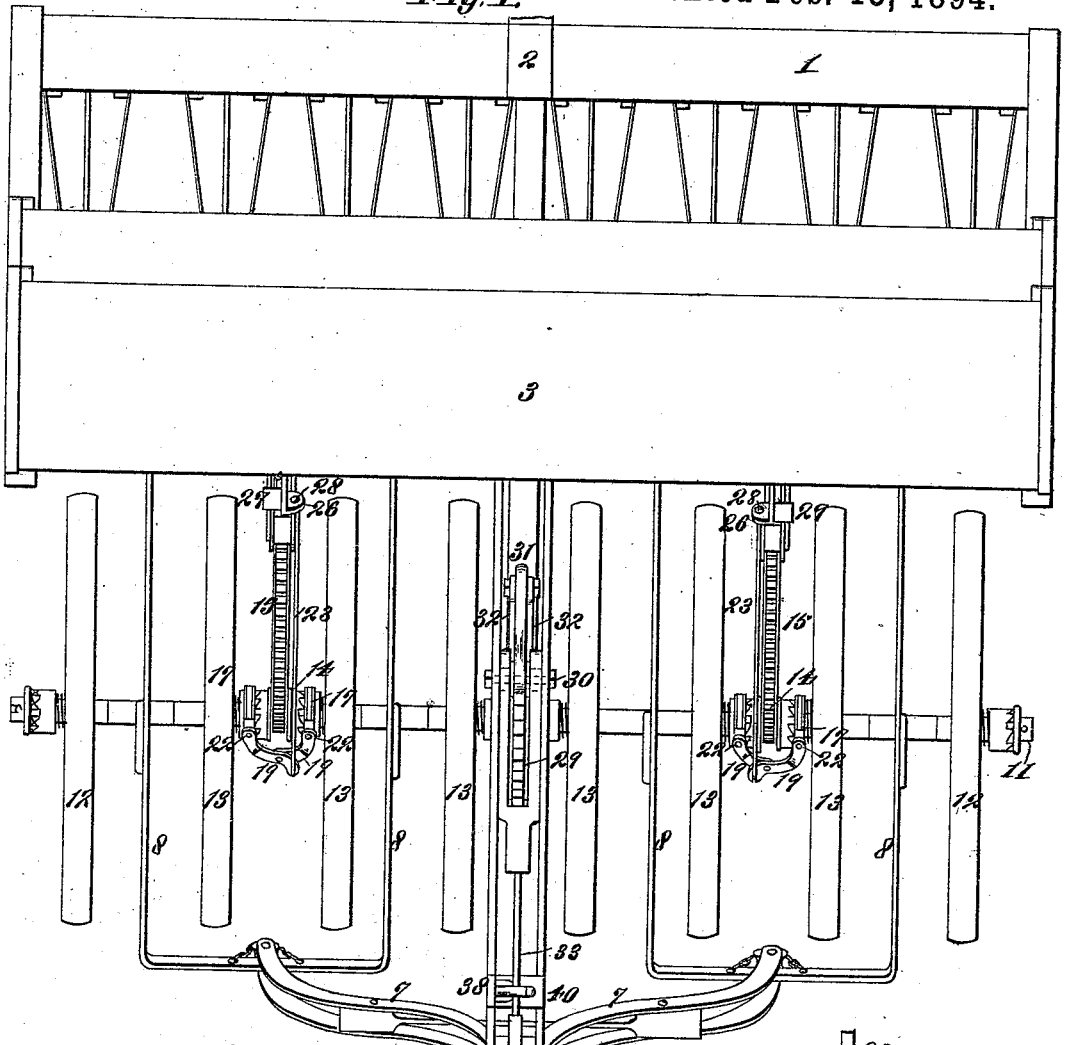

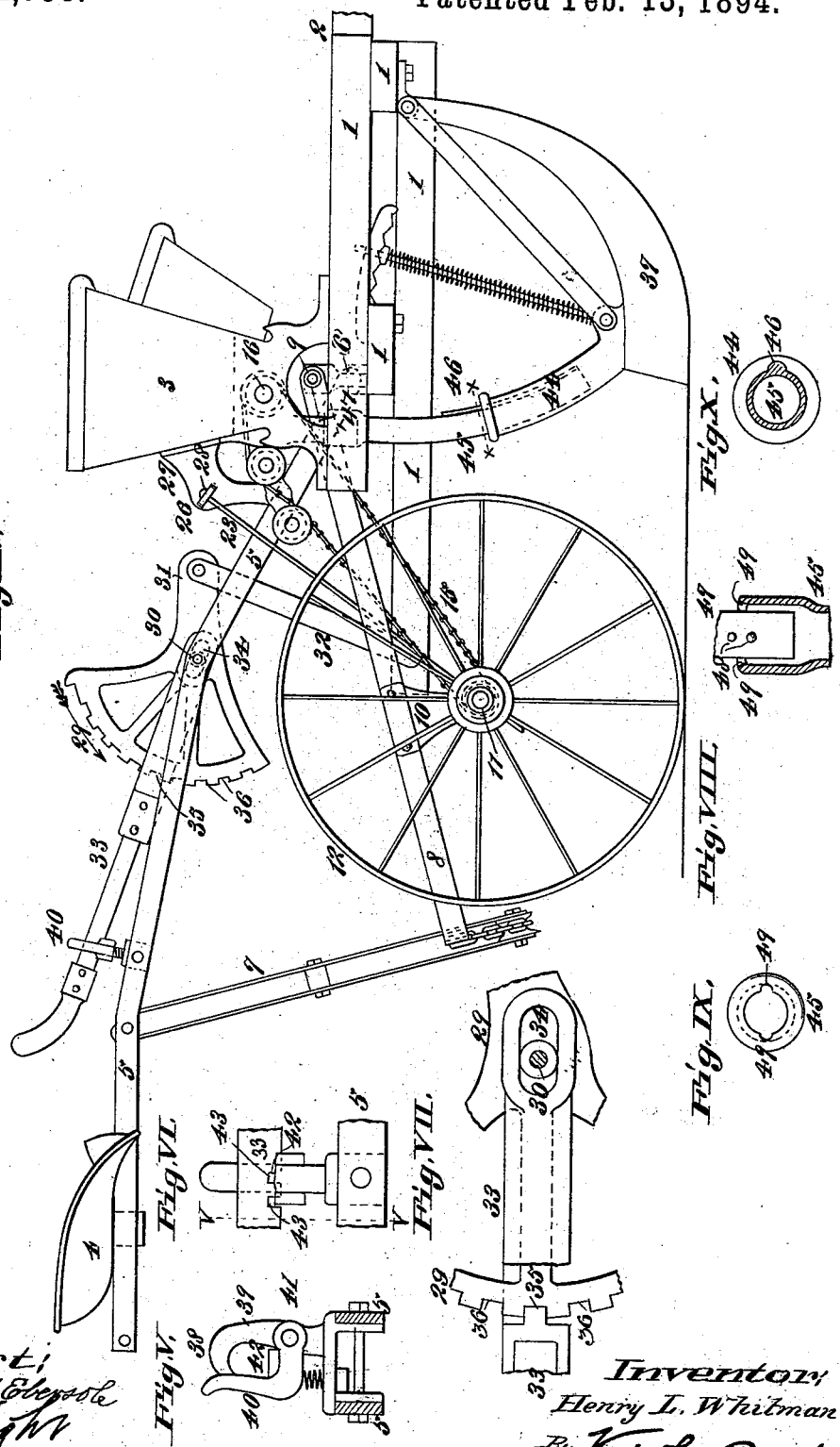

HENRY L. WHITMAN, OF ST. LOUIS, MISSOURI.

GRAIN-DRILL.

SPECIFICATION forming part of Letters Patent No. 514,798, dated February 13, 1894.

Application filed March 25, 1893. Serial No. 467,614. (No model.)

*To all whom it may concern:*

Be it known that I, HENRY L. WHITMAN, of the city of St. Louis, in the State of Missouri, have invented a certain new and useful Improvement in Grain-Drills, of which the following is a full, clear, and exact description, reference being had to the accompanying drawings, forming part of this specification.

My invention relates to certain improvements in grain drills, and my invention consists in features of novelty hereinafter fully described and pointed out in the claims.

Figure I is a top or plan view of my improved drill. Fig. II is an enlarged, detail view showing the automatic clutches and the paired links, pivoted together, having clutch-arms. Fig. III is a section taken on line III—III, Fig. II. Fig. IV is an elevation of my improved drill. Fig. V is an enlarged section of the seat beam, taken on line V—V, Fig. VI, and showing the lever catch in elevation. Fig. VI is an enlarged, detail view, showing a portion of the lever and seat beam, and showing the lever catch in elevation. Fig. VII is an enlarged, detail view of the lever, and quadrant. Fig. VIII is an enlarged, detail view, showing the manner of supporting the intermediate grain tubes or spouts. Fig. IX is a top view of one of the intermediate grain tubes or spouts. Fig. X is a section on line X—X, Fig. IV.

Referring to the drawings, 1 represents the main frame work of the drill, 2 is the tongue, 3 is the grain box, 4 is the driver's seat located on a beam 5, secured at its inner end to the frame 1, at 6, and supported near its outer end by a vertical frame, or substantially vertical frame 7, and horizontal or substantially horizontal frames 8; the frames 8 having pivotal connection 9 with the frame 1, and having brackets 10 which bear upon the wheel axle. No novelty is claimed in the parts thus far mentioned.

11 represents the axle upon which is mounted two outer press wheels 12, which serve to drive the axle by contact with the ground, and a number of intermediate press wheels 13, which are loosely mounted on the axle.

14 represents chain wheels, loosely mounted on the axle 11, and which receive chain belts 15, that extend to and drive the feed screw 16 of the grain box.

17 are sliding clutches adapted to be forced into engagement with the notched hubs of the wheels 14, by means of springs 18, as shown in Figs. I and II. The clutches 17 have a rib $11^a$ and groove $17^a$ or other suitable connection with the sleeve $11^b$ fixed on the axle 11, so that while they are free to move lengthwise of the axle they are caused to turn therewith. The clutches 17 are capable of being moved on the axle so as to disengage them from the hubs of the wheels 14. They are thus moved by paired links 19, pivoted together at 20, and which are bifurcated at their inner ends providing two arms $19^a$ on each link so as to embrace bands or rings 21 fitting in circumferential grooves in the clutches 17, and the arms are connected to the rings or bands 21 by pins 22, as clearly shown in Fig. II. It will be understood that as the pivot 20 is moved toward the wheels 14, the clutches will be thrown out of engagement with the chain-wheels 14, and when the pressure is removed the springs 18 will throw the clutches into engagement with the chain wheels and cause the movement of the belts 15, and the feed screw 16 by the turning of the axle 11. Links 19 are moved to disengage the clutches by means of a rod 23, having an open head 24 to straddle the axle, and which is connected to a horn or projection 25 on one of the links, (see Fig. III.) The upper end of the rod 23 passes through a projection 26 on a casting 27 secured to the grain box 3 or other support. The rod 23 has a head 28 above the projection 26.

29 is a quadrant pivoted to the seat beam 5 at 30, and connected at its inner end 31 to the frame 1 by means of links or bars 32.

33 represents a lever pivoted on the pin 30, and which has a slot 34, as shown by dotted lines Fig. IV, and by full lines, Fig. VII, to receive the pin 30, so as to permit of endwise movement of the lever to allow its projection 35 to be engaged in any one of the notches 36 of the quadrant. By moving the quadrant in the direction of the arrow, Fig. IV, through means of the lever 33, the inner end of the frame 1 is thrown or moved upwardly to remove the shoes 37 out of the ground. This movement of the frame 1 carries the rod 23 upwardly with it, and by moving the links 19 disengage the clutches 17 from the chain wheels 14, and thus the machine is thrown automatically out of gear in the act of raising the shoes out of the ground, so that when the shoes are raised to move the drill from place to place, the feed screw 16 will not be operated. When the shoes are lowered again into using position, the descent of the rod 23 permits the clutches to be automatically thrown into engagement with the chain wheels 14 to put the drill into gear again. There is, of course, a set of the clutches 17, links 19 and a rod 23 for each one of the chain wheels.

38 represents a catch secured to the seat beam 5, to hold the lever 33, to its adjustment. This catch consists of a fixed hook 39, and a spring actuated tongue 40, pivoted to the hook at 41, see Fig. V, the tongue serving to hold the lever into engagement with the hook. On the hook or tongue is a tooth or projection 42, adapted to receive either one of a pair of notches 43 in the lever, see Figs. V and VI, so that the lever may be held from longitudinal movement either into or out of engagement with the notches 36 of the segment. The shoes 37 have upwardly extending lower tubes 44, adapted to receive the lower ends of the intermediate grain tubes 45, which have ribs or feathers 46 fitting in notches in the lower tubes 44, so as to prevent the turning of the intermediate grain tubes 45, while not interfering with the vertical movement of the shoes 37. The intermediate grain tubes 45 connect at their upper ends with short upper tubes 47 secured to the grain box at the openings through which the grain passes. The intermediate grain tubes 45 are connected to the upper tubes 47, by being slipped thereover, as shown in Fig. VIII, the upper tubes 47 having pins or projections 48 above and below the inturned flange on the upper ends of the intermediate grain tubes 45. The intermediate grain tubes 45 have each notches 49 to permit the passage of the lower pins or projections 48, and then by turning the intermediate grain tubes 45 a quarter revolution before their lower ends are inserted in the lower tubes 44, the intermediate grain tubes 45 are held from vertical movement on the upper tubes 47, and the ribs or feathers 46 prevent the turning of the intermediate grain tubes 45, so that the notches 49 cannot come opposite the lower pin 48 while the machine is in use. The intermediate grain tubes 45 are made of iron and are curved to correspond to the curvature of the lower tubes 44, so as not to interfere with the rise and fall of the shoes 37. There is sufficient play between the pins 48 and the inturned flange of the intermediate grain tubes 45 to allow of sufficient lateral play or movement to the shoes 37 by making the intermediate grain tubes 45 of iron, while constructing them so as not to interfere with the vertical or horizontal play or movement of the shoe 37, a very permanent and effective arrangement is obtained. The wheels 12 and 13 are arranged on the axle so as to be directly behind the shoes 37, so as to compact the earth onto the covered grain.

I claim as my invention—

1. The combination of the main frame, an axle, driving wheels located on the axle, chain-wheels mounted loosely on the axle, having notched hubs, grain-box, having a feeding device, belts passing from the chain wheels to the feeding device, sliding clutches mounted on the axle, paired links pivoted together, each link having clutch-arms connected with the sliding clutches, connection between the links and the frame, and means for elevating the frame whereby when the latter is elevated the links are opened to disengage the clutches, and stop the feed; substantially as described.

2. The combination of the main frame, an axle, driving wheels located on the axle, chain wheels mounted loosely on the axle, having notched hubs, grain box, having a feeding device, belts passing from the chain wheels to the feeding device, sliding clutches mounted on the axle, having circumferential grooves, paired links pivoted together, each link having clutch arms, pins, and bands by which they are connected with the grooves of the clutches, connection between the links and the frame, and means for elevating the frame whereby when the latter is elevated the links are opened to disengage the clutches and stop the feed; substantially as described.

3. The combination of the main frame, an axle, driving wheels located on the axle, chain wheels mounted loosely on the axle, having notched hubs, grain-box having a feeding device, belts passing from the chain wheels to the feeding device, sliding clutches mounted on the axle, paired links pivoted together, each link having clutch-arms connected with the sliding clutches, bracket secured to the grain-box, the rod, connected to one of the links, passing through the bracket, and having a head above the bracket, and means for elevating the frame whereby when the latter is elevated the links are opened to disengage the clutches, and stop the feed; substantially as described.

4. The combination of the main frame, an axle, driving wheels located on the axle, chain wheels mounted loosely on the axle, having notched hubs, grain box having a feeding device, belts passing from the chain wheels to the feeding device, sliding clutches mounted on the axle, paired links pivoted together, each link having clutch-arms connected with the sliding clutches, connection between the links and the frame, springs for moving the clutches into engagement with the notched hubs of the chain wheels, a seat-beam, and a lever located on the seat beam for elevating the frame whereby when the latter is elevated the links are opened to disengage the clutches, and stop the feed; substantially as described.

5. The combination of the main frame, an axle, driving wheels located on the axle, chain wheels mounted loosely on the axle, having notched hubs, grain box having a feeding device, belts passing from the chain wheels to the feeding device, sliding clutches mounted on the axle, paired links pivoted together, each link having clutch-arms connected with the sliding clutches, connection between the links and the frame, springs for moving the clutches into engagement with the notched hubs of the chain wheels, a seat-beam, a quadrant pivoted to the seat-beam, a lever located on the seat beam for moving the quadrant, and a catch, located on the seat-beam, for holding the lever; substantially as described.

6. The combination of the shoes, the lower tubes, fitting in the shoes, having notches, the intermediate grain tubes having ribs at their lower portions fitting in the notches of the lower tubes and flanges at their upper ends provided with notches, and the upper tubes having pins for engaging the flanges on the intermediate grain tubes; substantially as described.

HENRY L. WHITMAN.

In presence of—
J. M. ELLIS,
E. EMANUEL.